US009542719B2

(12) United States Patent
Courroux et al.

(10) Patent No.: US 9,542,719 B2
(45) Date of Patent: Jan. 10, 2017

(54) DEVICE FOR IMAGE DECOMPOSITION USING A WAVELET TRANSFORM

(71) Applicant: COMMISSARIAT A L'ENERGIE ATOMIQUE ET AUX ENERGIES ALTERNATIVES, Paris (FR)

(72) Inventors: Sebastien Courroux, Villebon-sur-Yvette (FR); Stephane Chevobbe, Bourg-la-Reine (FR); Mehdi Darouich, Vanves (FR); Michel Paindavoine, Plombieres les Dijon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/431,283

(22) PCT Filed: Sep. 24, 2013

(86) PCT No.: PCT/EP2013/069761
§ 371 (c)(1),
(2) Date: Mar. 25, 2015

(87) PCT Pub. No.: WO2014/048886
PCT Pub. Date: Apr. 3, 2014

(65) Prior Publication Data
US 2015/0262325 A1    Sep. 17, 2015

(30) Foreign Application Priority Data

Sep. 26, 2012   (FR) ..................................... 12 59051

(51) Int. Cl.
*G06K 9/36* (2006.01)
*G06T 3/00* (2006.01)
(Continued)

(52) U.S. Cl.
CPC ........... *G06T 3/0056* (2013.01); *G06F 17/148* (2013.01); *G06T 1/20* (2013.01)

(58) Field of Classification Search
CPC .. H04N 19/124; H04N 19/132; H04N 19/137; H04N 19/14; H04N 19/17; H04N 19/1883; H04N 19/423; H04N 19/59; H04N 19/63; H04N 19/64; G06F 17/148; G06T 1/20; G06T 3/0056
(Continued)

(56) References Cited

U.S. PATENT DOCUMENTS

| 5,745,392 | A | * | 4/1998 | Ergas | ...................... G06T 9/005 |
| | | | | | 702/14 |
| 5,889,559 | A | * | 3/1999 | Yang | ...................... H04N 19/63 |
| | | | | | 375/240.11 |

(Continued)

FOREIGN PATENT DOCUMENTS

WO        02097718 A1    12/2002

OTHER PUBLICATIONS

Manfred Feil, et al., "Wavelet Packet Image Decomposition on MIMD Architectures", Real-Time Imaging, Academic Press Limited, Oct. 2002, pp. 399-412, vol. 8, No. 5, Elsevier Science Ltd., XP004419746.

(Continued)

*Primary Examiner* — Mekonen Bekele
(74) *Attorney, Agent, or Firm* — Baker & Hostetler LLP

(57) ABSTRACT

A device for decomposing images into at least three levels by wavelet transform comprises a first unit executing a first level of decomposition and a second unit executing the higher levels of decomposition by performing a sequence of processing tasks. The tasks are ordered in time by using a sequence of rows, a routing unit serving to configure the second unit when the level of decomposition associated with
(Continued)

the processing task currently being executed changes relative to the level of decomposition associated with the processing task executed previously. The processing tasks are ordered so that any given row is associated with only one level of decomposition.

9 Claims, 5 Drawing Sheets

(51) Int. Cl.
  *G06F 17/14* (2006.01)
  *G06T 1/20* (2006.01)
(58) Field of Classification Search
  USPC ........................................ 382/240, 248, 251
  See application file for complete search history.

(56) References Cited

U.S. PATENT DOCUMENTS

| | | | | |
|---|---|---|---|---|
| 5,999,656 | A * | 12/1999 | Zandi | H04N 19/635 |
| | | | | 375/E7.044 |
| 6,216,145 | B1 * | 4/2001 | Zandi et al. | 708/400 |
| 6,499,045 | B1 * | 12/2002 | Turney | G06F 17/148 |
| | | | | 708/400 |
| 6,587,589 | B1 * | 7/2003 | Chen | G06F 17/148 |
| | | | | 375/E7.045 |
| 6,684,235 | B1 * | 1/2004 | Turney et al. | 708/400 |
| 6,956,903 | B2 * | 10/2005 | Acharya | H04N 19/647 |
| | | | | 375/240.19 |
| 8,233,526 | B2 * | 7/2012 | Leonardi | H04N 19/46 |
| | | | | 348/335 |
| 9,451,291 | B1 * | 9/2016 | Bozinovic | H04N 19/91 |
| 2002/0186772 | A1 * | 12/2002 | Li | H04N 19/503 |
| | | | | 375/240.18 |
| 2004/0062448 | A1 * | 4/2004 | Zeng et al. | 382/251 |
| 2004/0126029 | A1 * | 7/2004 | Sakuyama | H04N 19/70 |
| | | | | 382/240 |
| 2007/0165959 | A1 * | 7/2007 | Takada | 382/240 |
| 2015/0172722 | A1 * | 6/2015 | Takada | H04N 19/91 |
| | | | | 382/235 |

OTHER PUBLICATIONS

Peng Cao, et al., "Area-Efficient Line-Based Two-Dimensional Discrete Wavelet Transform Architecture Without Data Buffer", International Conference on Multimedia and Expo, Jun. 28, 2009, pp. 1094-1097, IEEE, Piscataway, NJ, USA, XP031510945.

Hongyu Liao, et al., "Efficient Architectures for 1-D and 2-D Lifting-Based Wavelet Transforms" IEEE Transactions on Signal Processing, May 2004, pp. 1315-1326, vol, 52, No. 5, IEEE Service Center, New York, NY, USA, XP011110708.

\* cited by examiner

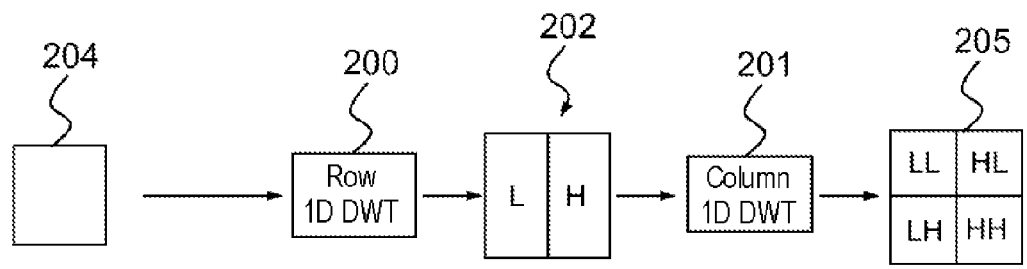
FIG.1a  FIG.1b
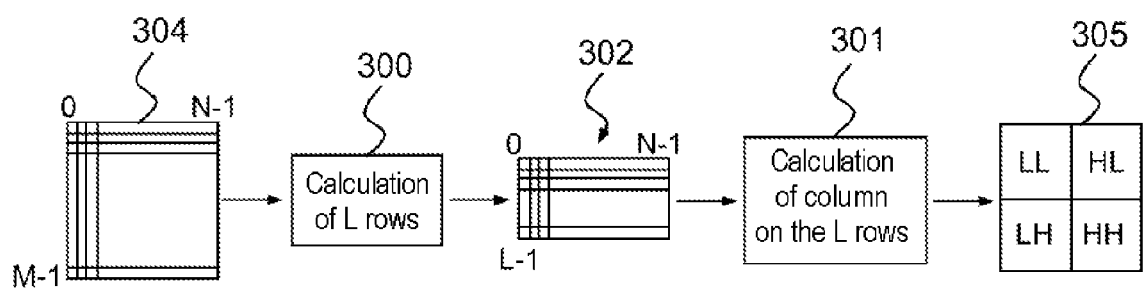
FIG.2
FIG.3 rows ↓

FIG. 8

| row | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 2 | 3 | 2 | 4 | 2 | 3 | 2 |   | 2 | 3 | 2 | 4 | 2 | 3 | 2 |   |
| 1 |   |   |   |   |   |   |   |   |   |   |   |   |   |   |   |   |
| 2 | 2 |   | 2 |   | 2 |   | 2 |   | 2 |   | 2 |   | 2 |   | 2 |   |
| 3 |   |   |   |   |   |   |   |   |   |   |   |   |   |   |   |   |
| 4 | 2 | 3 | 2 |   | 2 | 3 | 2 |   | 2 | 3 | 2 |   | 2 | 3 | 2 |   |
| 5 |   |   |   |   |   |   |   |   |   |   |   |   |   |   |   |   |
| 6 | 2 |   | 2 |   | 2 |   | 2 |   | 2 |   | 2 |   | 2 |   | 2 |   |
| 7 |   |   |   |   |   |   |   |   |   |   |   |   |   |   |   |   |
| 8 | 2 | 3 | 2 | 4 | 2 | 3 | 2 |   | 2 | 3 | 2 | 4 | 2 | 3 | 2 |   |
| 9 |   |   |   |   |   |   |   |   |   |   |   |   |   |   |   |   |
| 10 | 2 |   | 2 |   | 2 |   | 2 |   | 2 |   | 2 |   | 2 |   | 2 |   |
| 11 |   |   |   |   |   |   |   |   |   |   |   |   |   |   |   |   |
| 12 | 2 | 3 | 2 |   | 2 | 3 | 2 |   | 2 | 3 | 2 |   | 2 | 3 | 2 |   |
| 13 |   |   |   |   |   |   |   |   |   |   |   |   |   |   |   |   |
| 14 | 2 |   | 2 |   | 2 |   | 2 |   | 2 |   | 2 |   | 2 |   | 2 |   |
| 15 |   |   |   |   |   |   |   |   |   |   |   |   |   |   |   |   |

FIG. 9

| row | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 2 |   | 2 |   | 2 |   | 2 |   | 2 |   | 2 |   | 2 |   | 2 |   |
| 1 |   | 3 |   |   |   | 3 |   |   |   | 3 |   |   |   | 3 |   |   |
| 2 | 2 |   | 2 |   | 2 |   | 2 |   | 2 |   | 2 |   | 2 |   | 2 |   |
| 3 |   |   |   |   |   | 4 |   |   |   |   |   | 4 |   |   |   |   |
| 4 | 2 |   | 2 |   | 2 |   | 2 |   | 2 |   | 2 |   | 2 |   | 2 |   |
| 5 |   | 3 |   |   |   | 3 |   |   |   | 3 |   |   |   | 3 |   |   |
| 6 | 2 |   | 2 |   | 2 |   | 2 |   | 2 |   | 2 |   | 2 |   | 2 |   |
| 7 |   |   |   |   |   |   |   |   |   |   |   |   |   |   |   |   |
| 8 | 2 |   | 2 |   | 2 |   | 2 |   | 2 |   | 2 |   | 2 |   | 2 |   |
| 9 |   | 3 |   |   |   | 3 |   |   |   | 3 |   |   |   | 3 |   |   |
| 10 | 2 |   | 2 |   | 2 |   | 2 |   | 2 |   | 2 |   | 2 |   | 2 |   |
| 11 |   |   |   |   |   | 4 |   |   |   |   |   | 4 |   |   |   |   |
| 12 | 2 |   | 2 |   | 2 |   | 2 |   | 2 |   | 2 |   | 2 |   | 2 |   |
| 13 |   | 3 |   |   |   | 3 |   |   |   | 3 |   |   |   | 3 |   |   |
| 14 | 2 |   | 2 |   | 2 |   | 2 |   | 2 |   | 2 |   | 2 |   | 2 |   |
| 15 |   |   |   |   |   |   |   |   |   |   |   |   |   |   |   |   |

DEVICE FOR IMAGE DECOMPOSITION USING A WAVELET TRANSFORM

CROSS-REFERENCE TO RELATED APPLICATIONS

This application is a National Stage of International patent application PCT/EP2013/069761, filed on Sep. 24, 2013, which claims priority to foreign French patent application No. FR 1259051, filed on Sep. 26, 2012, the disclosures of which are incorporated by reference in their entirety.

FIELD OF THE INVENTION

The invention relates to a device for decomposing images into at least three levels using a wavelet transform, and is applicable, notably, to the field of image processing.

BACKGROUND

By using the wavelet representation of a signal it is possible not only to decompose the signal into different frequency bands, as is done by Fourier analysis, but also to obtain different representations of the signal at different scales. The extension of this decomposition to two-dimensional (2D) signals also provides information on the orientation of the irregularities present in the image.

The wavelet transform has qualities which are useful for signal and image processing, because it enables a temporal, frequency and multiscale representation of a signal to be obtained. This method of analysis is a logical development of Fourier transform analysis, the dimensional analysis associated with this wavelet transform enabling the signal to be studied at different scales.

By contrast with the analysis of a continuous signal, the mother wavelet translation and expansion parameters vary in a discrete manner for the analysis of a discrete signal. The progressive increase of the expansion factor is obtained by applying the wavelet filtering operation recursively to the same discrete signal.

By way of illustration, a one-dimensional (1D) signal is decomposed by the following procedure: the original signal is decomposed into a detail signal Wd1 amplifying the high-frequency components of the signal and into an approximation signal Wa1 which provides a smoothed view of the original signal. The latter is, in turn, decomposed into a detail signal Wd2 and an approximation signal Wa2. This procedure is then repeated until the desired number of levels of decomposition have been obtained. A series of detail signals, Wd1, . . . , Wdn is obtained, together with a signal Wan, all of which enable the input signal to be analyzed on different scales.

By using orthogonal decomposition filters it is possible to reconstruct the information and suppress the redundancy present in the approximation and detail bands. It is therefore possible to apply an operation of subsampling by a factor two to the output of each filter, thereby providing a concise representation of the information, the number of samples between the input and the output of the transform being conserved.

2D decomposition of a signal is carried out by successive decomposition along the horizontal axis and then along the vertical axis. Three detail subimages LH, HL and HH are obtained, together with an approximation subimage. The signal HH, corresponding to the result of two successive high-pass filters, is commonly called the diagonal signal. Similarly, the signals LH and HL can be related to vertical and horizontal signals respectively. The approximation signal is decomposed again to obtain a multiscale decomposition. The resulting coefficients are interlaced in terms of both orientation and scale.

FIG. 1a shows an interlaced representation of the decomposition of an image. FIG. 1b shows a non-interlaced representation of the decomposition.

2D architectures of the DWT type (an acronym for the English expression "Discrete Wavelet Transform") may be classified according to two different methods. The first method is called "row-column" and the second method is called "row by row".

FIG. 2 shows the row-column decomposition method. The operation is divided into two 1D transforms, of which one, 200, is horizontal and the other, 201, is vertical. The horizontal transform operation 200 is applied initially to an input image 204. The transformed coefficients are placed in a short-term memory 202 with a size of N×M, corresponding to the size of the initial image. The vertical transform operation 201 is then applied in a second step, to provide a final image 205. This structure has the advantage of being easy to implement, since the two transforms 200, 201 are totally independent. A major drawback of this method is the large amount of memory required for this type of implementation. This memory, exclusively reserved for the transform operation, has a size of N×M and must be located close to the processing units to avoid costly reading and writing of the coefficients. This memory significantly increases the total surface area of the component executing the coding. Consequently, this type of structure is little used in practice.

FIG. 3 is a schematic illustration of the nature of a row-by-row transform. This type of transform can reduce the intermediate memory cost. This is because, in this type of implementation, a row memory 302 is used, with a size of L×M, where L is the size of the filter used. This memory replaces the image memory, and allows the short-term storage of the coefficients produced by the horizontal transform unit 300. By way of example, L=3 for the CDF 5/3 wavelet.

The vertical transform operation 301 is then launched as soon as the number of rows in memory is sufficient to apply the vertical filter. With this type of implementation, it is possible to change from an image memory with a size of N×M to a row memory with a size of L×M. For the 9/7 transform, five rows of coefficients must be stored. Only four rows of coefficients are required in some architectures. An inherent drawback of the use of this method is that finer control is required, both in reading to and writing from the buffer memory 302, and in the launching of the vertical transform 301.

FIG. 4 shows an example of an architecture that requires no intermediate memory for storing the wavelet coefficients between the vertical and horizontal passes.

An architecture for reducing the memory requirements was proposed in the paper by Peng Cao, ChaoWang, Jun Yang and Longxing Shi entitled *Area-efficient line-based two dimensional discrete wavelet transform architecture without data buffer*, ICME 2009, IEEE International Conference on Multimedia and Expo, pages 1094-1097, 28, 3 Jul. 2009. This architecture does not require an intermediate memory, known as a transposition memory, for storing the wavelet coefficients between the vertical and horizontal passes. It also allows the execution of a 5/3 or 9/7 decomposition, direct or inverse according to the configuration. The input pixels 400 are scanned row by row, one pixel being transmitted in each calculation cycle. Two elementary modules 401, 402 are used. A first module 401 performs the vertical transform, using CPE (Column Processing Element) calculation elements 403, 404. A second module 402, receiving the results 407 from the preceding unit 401, performs the horizontal transform, using RPE (Row Processing Element) calculation elements 405, 406. The resulting approximation coefficients are stored 408 in a RAM (Random Access Memory) to enable the next level of decomposition to be executed. Here again, a problem of memory arises. In this example, a quarter of an image has to be stored in the RAM 408.

The paper by H. Liao, M. K. Mandal, and B. F. Cockburn, entitled *Efficient architectures for 1-d and 2-d lifting-based wavelet transforms*, IEEE Transactions on Signal Processing, 52(5): 1315-1326, 2004, proposes the execution of a multi-level 2D decomposition using a recursive implementation of the DWT transform. The transform module is composed of two 1D transform units, one horizontal and one vertical, separated by a plurality of FIFOs used for storing the coefficients of each level. These FIFOs are used to accumulate a sufficient number of coefficients for the execution of the column by column transform, for each transform level. It was decided that the processing of the first level of decomposition would be carried out in only one out two calculation cycles, so that the higher levels of decomposition could be inserted between the first-level decompositions. Although the architecture ultimately requires only four lines of short-term memory for the execution of the CDF 9/7 transform, a complicated control system is required to manage the various FIFOs as well as the delay registers. This architecture performs the multi-level decomposition of an image by ordering the decomposition tasks related to the different levels on the same row. Since all the levels of decomposition can be processed on the same row, the decomposition unit is used intensively during the processing of these rows, and not at all during the following rows, where there is no need to carry out several levels of decomposition. It is also necessary to reconfigure the processing unit data path at each calculation cycle during the transform rows according to the current level of decomposition. Furthermore, the number of storage registers in the horizontal decomposition units must be increased, and specific addressing must be developed, so as not to overwrite the intermediate coefficients within a row. Thus this choice greatly increases the critical path length, and reduces the overall performance of the transform module. This architecture uses two rows of memory to delay the data produced between the different levels of decomposition and a complex mechanism is used to upload and download the coefficients to and from these memories.

Many on-board applications require the use of wavelet transforms. It is therefore important to find architectures that enable the requisite memory size to be reduced, with the lowest possible difficulty of implementation.

In the rest of the description, the CDF 5/3 and CDF 9/7 filters are used as examples. These are wavelet filters invented by Cohen, Daubechies and Fauveau. Each of these filters has specific properties. The 5/3 filter allows loss-free compression and decompression. The 9/7 filter offers a better compression rate, but introduces losses. The equivalent size of these filters is three coefficients for the 5/3 and five coefficients for the 9/7 filter. Although these two filters are used as examples, the invention can be applied using any type of filter.

SUMMARY OF THE INVENTION

One object of the invention is, notably, to overcome the aforesaid drawbacks.

To this end, the invention relates to a device for decomposing images into at least three levels by wavelet transform, comprising a first unit executing a first level of decomposition and a second unit executing the higher levels of decomposition by performing a sequence of processing tasks. Said tasks are ordered in time by using a sequence of rows, a routing unit serving to configure the second unit when the level of decomposition associated with the processing task currently being executed changes relative to the level of decomposition associated with the processing task executed previously. The processing tasks are ordered so that any given row is associated with only one level of decomposition.

According to one aspect of the invention, the processing tasks associated with level two of decomposition are executed on one row out of two, the processing tasks associated with the higher levels being executed on the other rows.

According to another aspect of the invention, a set of variables used as a timing reference is determined and updated periodically by the second decomposition unit, this set of variables corresponding to the indices of the current row and the current column processed by the second decomposition unit.

By way of example, the routing unit generates a configuration signal at the start of a row, this signal being sent to the second decomposition unit in order to parameterize the data path of the processing modules of which it is composed.

According to another aspect of the invention, a row is referenced by a row index j, said index being initialized to zero when the first row of decomposition coefficients generated by the first decomposition unit reaches the input of the second decomposition unit.

The rows with the index j that satisfy the following expression are, for example, reserved for the transform level k:

$$\{j-(2^{k-2}-1)\}\%2^{k-1}=0$$

where % represents the modulo operator.

In one embodiment, the row index j is represented in base two, the current decomposition level being determined by determining the number of consecutive "ones" in the direction from the least significant bit to the most significant bit.

The invention also proposes a method for ordering the processing tasks executed in the second processing unit of a device as described above, comprising the following steps:
 a. determining the current decomposition level;
 b. determining the parity of the current row as a function of the decomposition level;
 c. checking to determine whether a processing task has to be executed;
 d. acquiring the input coefficients for the processing task to be executed;
 e. executing the processing task and generating an output coefficient.

The invention also proposes a computer program including instructions for executing the ordering method when the program is executed by a processor.

BRIEF DESCRIPTION OF THE DRAWINGS

Other characteristics and advantages of the invention will be apparent from the following non-limiting description, provided for illustrative purposes, which refers to the attached drawings, in which:

FIG. 1a shows an interlaced representation of the decomposition of an image;

FIG. 1b shows a non-interlaced representation of the decomposition of an image;

FIG. 2 shows the principle of row-column decomposition;

FIG. 3 is a schematic illustration of the nature of a row-by-row transform;

FIG. 8 shows a first aliasing control method intended to distribute on the same row the processing tasks relating to different decomposition levels;

FIG. 9 shows a second aliasing control method intended to provide optimal distribution of the multi-level transform operations;

DETAILED DESCRIPTION

Figure 4:
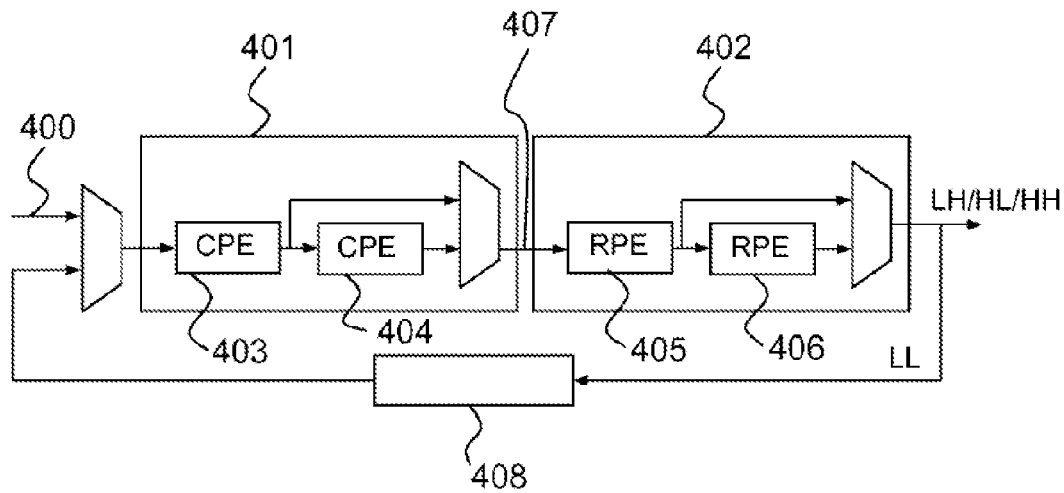
FIG. 4 shows an example of an architecture that requires no intermediate memory for storing the wavelet coefficients between the vertical and horizontal passes.
Figure 5:
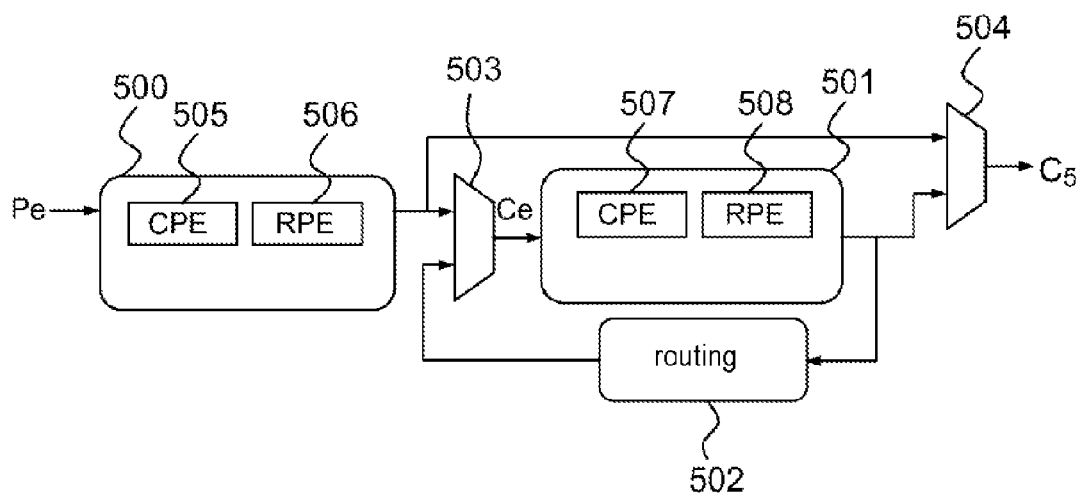
FIG. 5 provides an example of multi-level wavelet transform architecture including an aliased decomposition unit.

FIG. 5 provides an example of multi-level wavelet transform architecture. This architecture has both a de-aliased and an aliased appearance. It has an aliased appearance in the sense that a plurality of decomposition levels are processed by the same decomposition unit, and a de-aliased appearance in that single-level decomposition units are chained to provide multi-level decomposition.

In other words, some of the equipment is duplicated, requiring the use of two decomposition units, but another part of the equipment is re-used. This is because one of the two processing units is used to execute several decomposition levels. This is made possible by the use of a routing network.

In the example shown in FIG. 5, two decomposition units are considered. As explained above, the first decomposition unit 500 is responsible for the first-level decomposition. It comprises modules for column processing 505 and row processing 506 on the pixels Pe of the input image. The second decomposition unit 501 is responsible for the decomposition of all the following levels. It also comprises modules for column processing 507 and row processing 508 on the coefficients Ce presented to its input.

A multiplexer 503 is used so as to select the result of the level one decomposition as input coefficients of the second unit when the unit 502 executes the level two decomposition. When the unit 502 executes a decomposition at a level higher than two, the multiplexer 503 selects the samples supplied by a routing network 502. The routing network uses as its inputs the coefficients resulting from the decompositions performed by the module 501.

A multiplexer 504 is used to select the coefficients Cs at the output of the architecture. Thus, when level one decomposition is in progress, the output of the unit 500 is selected, whereas, when decomposition at level two or above is in progress, it is the output of the unit 502 that is selected.

Advantageously, this architecture permits optimal hardware utilization with low main storage requirements.

Figure 6:
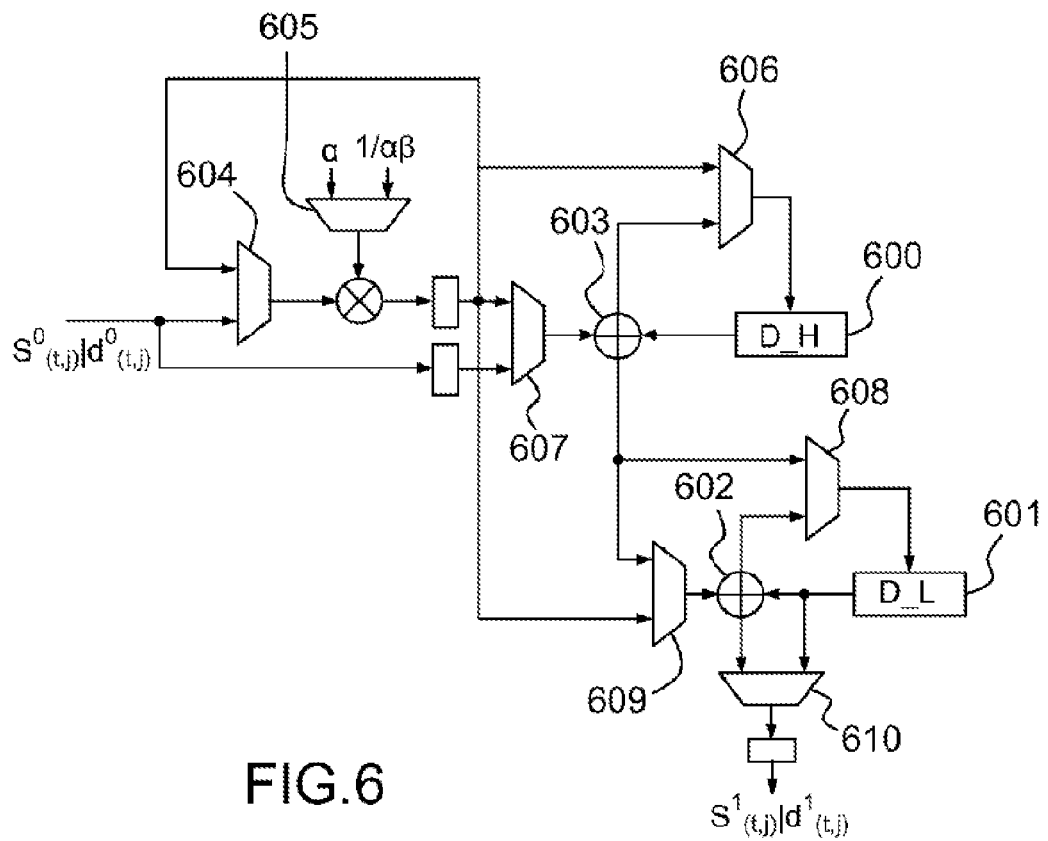
FIG. 6 shows an example of a row processing module RPE.

FIG. 6 shows an example of a row processing module RPE that can be used for the level one decomposition.

The 2D wavelet transform is obtained by the successive application of vertical and horizontal transforms, without an intermediate buffer memory. The RPE (Row Processing Element) transform unit executes the horizontal transform. It incorporates two registers 600, 601 for storing the intermediate coefficients required for the calculations. Two addition operators 602, 603 and a 3-bit shift operator are used for calculating the coefficients. Control of the operations and paths is provided by multiplexers 604, 605, 606, 607, 608, the state of which depends on the parity of the current row.

Figure 7:
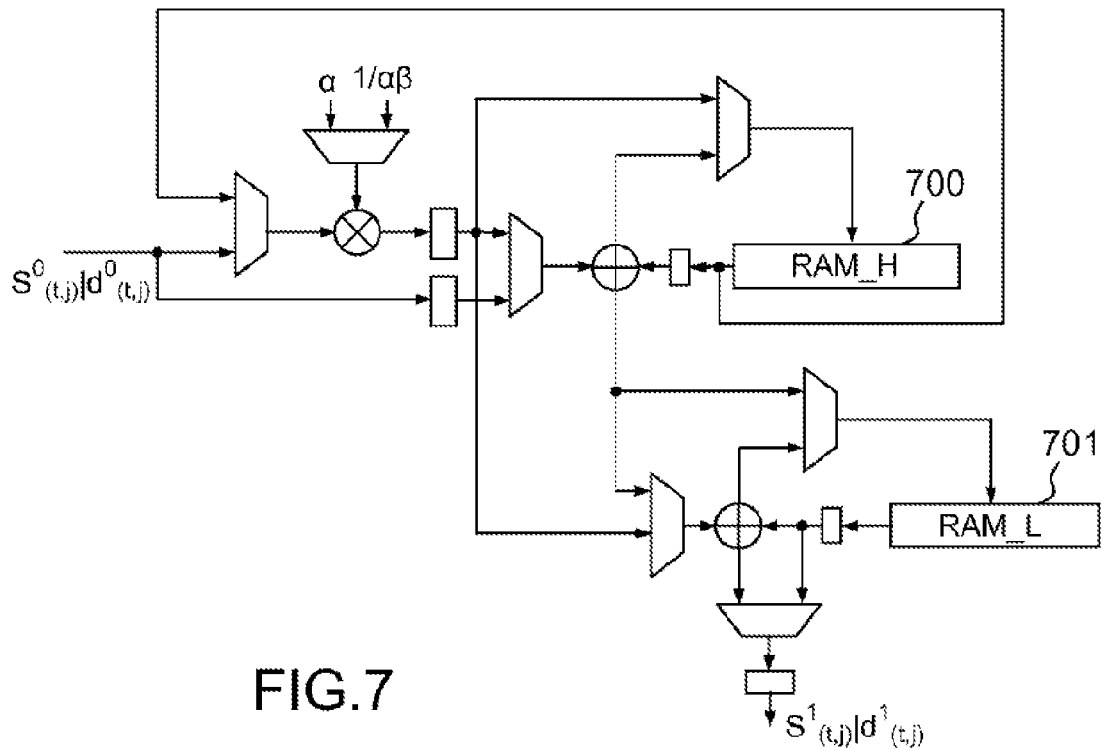
FIG. 7 shows an example of a column processing module RCE.

FIG. 7 shows an example of a column processing module RCE that can be used for the level one decomposition. This unit is used for the vertical transform. It resembles the horizontal transform unit, but with the two registers 600, 601 replaced with two row memories 700, 701 providing read access and write access for each cycle.

For the decomposition of the higher levels, as explained above, a second decomposition unit 501 is responsible for the levels higher than two. CPE and RPE processing modules identical to those shown in FIGS. 6 and 7 may be used. The second decomposition unit 501 also has a two-row internal memory which is sufficient to store all the intermediate coefficients of the various decomposition levels. This decomposition unit uses an aliased structure. Because of this structure, the calculation tasks corresponding to the different decomposition levels must be ordered.

The approximation coefficients produced by the first decomposition unit 500 are available on one row out of two, for example on the rows with even indices.

To limit the use of intermediate memories, the approximation coefficients produced by the first unit 500, executing the first decomposition level, must be used directly by the second decomposition unit 501, that is to say without intermediate storage.

A local context is associated with the second decomposition unit 501 to enable it to order the tasks that it has to perform. This local context forms a reference and corresponds, for example, to the indices of the row and column being processed by the second decomposition unit 501.

If a transform using a CDF 5/3 filter is used, a latency of two rows is introduced. This is because three input coefficients are required to produce a filtered coefficient. If the filter is applied horizontally, two input coefficients have to be stored. As soon as the third is available, an output coefficient is produced. Consequently there is a latency of two coefficients. If the filter is applied vertically, two rows of coefficients have to be stored. Thus, as soon as the reading of the third row starts, output coefficients will be produced by the filtering of the input coefficients. In the case of 2D filtering, the latency is therefore two rows and two coefficients (columns).

Although the first coefficients supplied at the output of the first decomposition unit 500 are available on row three, it is conventionally considered, for example, that the first row of coefficients is available on row zero of the unit 501. For this purpose, the local context must be initialized accordingly.

As explained above, the input coefficients Ce of the second decomposition unit 501 may be obtained from two separate sources. The first source corresponds to the first decomposition unit 500. In this case, the processing is carried out in the flow and the data leaving the unit 500 are directly sent to the unit 501, no memory being required. The input data of the second decomposition unit 501 may also be obtained from the routing network unit using a feedback loop. In this case, the coefficients to be processed are read from the routing network before being processed.

The data control at the input of this unit is therefore provided by the multiplexer 503, the configuration of which depends on the current decomposition level.

The data presented at the output of the second decomposition unit 501 may be sent to the routing network 502, or may be sent to the output of the circuit, for storage in an output memory, for example. This decision depends on the current decomposition level, but also on the parity of the current row and column.

The approximation coefficients must either be sent to the output of the circuit, or be sent to the routing network so that another level of decomposition can be applied there. The approximation coefficients are therefore stored in a row memory, except in the case where the current decomposition level is equal to the last decomposition level. A row memory is a memory capable of storing all the coefficients of a given row. It is accessed, for example, by using the index of the current column.

When the data are available at the input of the second decomposition unit 501, the data path inside said unit must be reconfigured in order to apply the appropriate processing.

The module called the "routing network", 502, therefore has two functions. A first function is to configure the data path by configuring the multiplexers of the RPE and CPE units. A second function is to store the approximation coefficients as mentioned above, and to supply them to the second decomposition unit 501 for a further level of decomposition.

For this purpose, two signals are, for example, sent to the decomposition module.

The first is a signal that activates or disables the RPE or CPE module. This first signal is, for example, a "0" bit for disabling a module, or a "1" bit for activating a module.

The second signal includes the parity information for the row being processed, with allowance for the current decomposition level. This second signal is, for example, a "0" bit for an even row, or a "1" bit for an odd row. The parity of the row is determined after the current decomposition level has been ascertained.

Two aliasing control methods used by the routing network are described below and compared.

A first aliasing control method has the aim of carrying out all the processing on the same row. For this purpose, it is necessary to consider the row latency caused by the passage through the various storage registers of the horizontal transform module of the second decomposition unit 501.

Just as there is a latency of two rows, there is also a latency of two columns during which the resulting coefficients are not valid. If a CDF 5/3 filter is used, the first valid coefficient produced by the unit 501 is available on the third row in the third column. It is then possible to propagate the resulting coefficient directly to the input of the unit and to process it in the next cycle, the unit 501 being inactive for the time being for the odd-numbered column indices.

A second method has the aim of distributing the multi-level transform operations in time. For this purpose, some rows are reserved for the level two decomposition processing, while other rows are reserved for the decomposition processing at higher levels.

FIG. 8 shows a first aliasing control method intended to distribute on the same row the processing tasks relating to the different decomposition levels.

In this example, representative of a method found in the prior art, the processing corresponding to all the decomposition levels is carried out on the same row.

The main advantage of this distribution of the decomposition tasks on a row is that there is no need to store the resulting coefficients, since they are directly propagated through the network. However, the use of this distribution of processing task has a number of drawbacks. Given that all the decomposition levels are executed on the even rows, the activity of the second decomposition unit 501 is high during the processing of these rows, whereas it is zero for the odd rows.

It is also necessary to reconfigure the processing unit data path at each calculation cycle in the transform rows. Furthermore, the number of storage registers in the RPE processing module 508 must be increased, and specific addressing must be developed there, so as not to overwrite the intermediate coefficients within a row. This choice increases the critical path length, and reduces the overall performance of the circuit executing the transform.

FIG. 9 shows a second aliasing control method intended to provide optimal distribution of the multi-level transform operations.

As emphasized above, the concentration on the same row of the decomposition tasks associated with different levels has many drawbacks. One of the aims of the invention is to execute a distribution of the tasks corresponding to the different decomposition levels on all the rows.

In a preferred embodiment, the second decomposition level is executed on even rows, and the processing associated with the next decomposition levels is executed on the odd rows. Whether a row is even or odd is clearly dependent on the value of the index associated with it.

More generally, the processing tasks associated with level two of decomposition are executed on one row out of two, the processing tasks associated with the higher levels being executed on the other rows. The invention applies an essential principle. The tasks are ordered so that any given row is associated with only one level of decomposition. This has the basic advantage of reducing the occurrence of the reconfiguration operations. In other words, it makes it possible to reconfigure the data path only at the start of a row, thus avoiding an excessively large effect on the performance.

In order to execute this intelligent distribution of the processing, a delay memory, also called the row memory, is used. This memory is responsible for storing the approximation coefficients generated by the second processing unit 501 so that they can be used in the next rows.

Each processing unit can have its own context in the form of a row and column index. It may, for example, be agreed to make the arrival of the first row of valid coefficients at the input of the second decomposition unit 501 correspond to the zero row index.

All the even rows are then reserved for the processing of the second transformation level. The odd rows may then be allocated to the processing of the higher transformation levels.

The level K processing cannot start until the first approximation coefficients of level K−1 are available. Thus the processing of the third transform level cannot start until after row four, for which the first valid approximation coefficients of level two are available. Row five is therefore reserved for the level three transformation. The same applies to row nine. The first valid approximation coefficients at the output of level three are available at rows thirteen and twenty-one, and rows nineteen and twenty-seven are used for the level four transform.

Various architectures for the execution of a multi-level 2D decomposition, using the CDF 5/3 and CDF 9/7 filters, may be considered. There are implementations of these architectures in various architectural targets of the ASIC (Application-Specific Integrated Circuit), FPGA (Field-Programmable Gate Array), DSP (Digital Signal Processor), GPU (Graphics Processing Unit) or GPP (General Purpose Processor) types.

Figure 10:
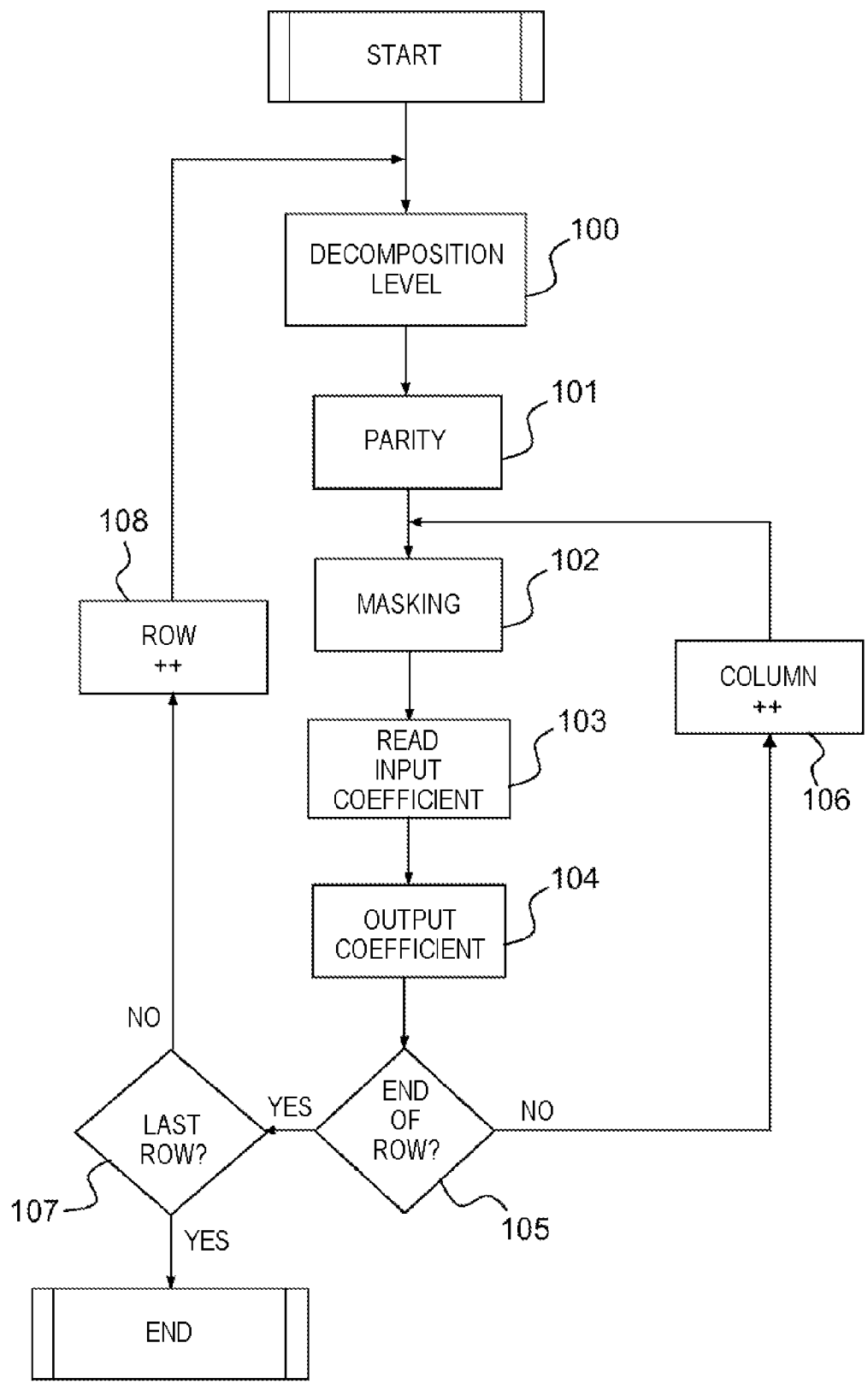
FIG. 10 shows an exemplary embodiment of the aliasing control method according to the invention.

FIG. 10 shows an exemplary embodiment of the aliasing control method according to the invention.

A first step 100 is applied at the start of a row, with the aim of determining the current decomposition level. For this purpose, the binary representation of the row index may be used. The position of the first "0", reading the word from right (LSB) to left (MSB), indicates the current decomposition level.

As a general rule, the rows with the index j that satisfy the following expression are reserved for the transform level k:

$$\{j-(2^{k-2}-1)\}\%2^{k-1}=0$$

where % represents the modulo operator.

It is desirable for the decomposition level to be determined as rapidly as possible as a function of the row index, for the purpose of reconfiguring the data path. For this purpose, it is possible to take into account, in the binary representation of the row index, the number of consecutive logical "1"s before the first "0", in the direction from the least significant bit (LSB) to the most significant bit (MSB).

If no "1" is detected in the binary representation of the row index, this means that the current row corresponds to the second decomposition level.

If two consecutive "1"s are detected, this means that the current transform level is equal to four.

The table below illustrates this method in the case where the row index is encoded in eight bits. Thus the number of consecutive "1"s detected can be made to correspond to a given decomposition level.

| binary representation | | | | | | | | k |
|---|---|---|---|---|---|---|---|---|
| X | X | X | X | X | X | X | 0 | 2 |
| X | X | X | X | X | X | 0 | 1 | 3 |
| X | X | X | X | X | 0 | 1 | 1 | 4 |
| X | X | X | X | 0 | 1 | 1 | 1 | 5 |
| X | X | X | 0 | 1 | 1 | 1 | 1 | 6 |
| X | X | 0 | 1 | 1 | 1 | 1 | 1 | 7 |

In a second step 101, the parity of the current row is determined as a function of the decomposition level. This may be done by analyzing the row index. By taking the current decomposition level into account, the parity of the current row can be deduced. This may be done by examining the value of the bit following the first "0". If it is a "0", the row is even; otherwise the row is odd.

The CPE processing module can then be configured. Advantageously, the calculation path of this processing module is not modified again from here to the end of the row.

In a third step 102, a check is made as to whether a decomposition operation must be executed for the column identified by the local context. For this purpose, a binary operation of the masking type may be performed between the decomposition level and the column index, to determine whether a processing task is to be executed.

If a decomposition operation is to be executed, a step 103 of acquiring an input coefficient is executed. This coefficient is obtained either from the routing network (k>=3) or from the first decomposition unit 500 (output of the first processing unit when k=2). The origin of the coefficient depends on the decomposition level.

In a fifth step, an output coefficient 104 is produced after the processing of the selected input coefficients. Depending on the decomposition level, the coefficient is either rewritten to the row memory of the routing network.

A check is then made (105) as to whether the end of the row has been reached. If this is not the case, the local context is updated so that the column index is incremented (106), and the method restarts at step 102. If it is the case, a check is then made (107) as to whether the current row is the last row of the decomposition. If this is the case, the execution of the method is terminated. If the current row is not the last row, the row index is incremented (103) and the method restarts at step 100.

The invention claimed is:

1. A device for decomposing images into at least three levels by wavelet transform, comprising:
    a first decomposition unit executing a first level of decomposition;
    a second decomposition unit executing higher levels of decomposition by executing a series of processing tasks, said processing tasks are ordered in time by using a sequence of rows; and
    a routing unit serving to configure the second decomposition unit when a level of decomposition associated with a processing task currently being executed changes relative to a level of decomposition associated with a processing task executed previously, the processing tasks being ordered so that any given row is associated with only a single level of decomposition,
    wherein the first and the second decomposition units and the routing unit are associated with the device for recomposing images and are configured and realized by a processor configured to execute a computer program code for wavelet transforms, and
    wherein the routing unit generates a configuration signal at a start of a row, to be sent to the second decomposition unit having processing modules in order to parameterize a data path of said processing modules.

2. The device as claimed in claim 1, wherein the processing tasks associated with level two of decomposition are executed on one row out of two, the processing tasks associated with the higher levels being executed on the other rows.

3. The device as claimed in claim 1, wherein a set of variables used as a timing reference is determined and updated periodically by the second decomposition, said set of variables corresponding to an index of a current row and a current column processed by the second decomposition unit.

4. The device as claimed in claim 1, wherein a row is referenced by a row index j, said row index being initialized to zero when a first row of decomposition coefficients generated by the first decomposition unit reaches an input of the second decomposition unit.

5. The device as claimed in claim 4, wherein the rows with the row index j that satisfy the following expression are reserved for a transform level k:

$$\{j-(2^{k-2}-1)\}\%2^{k-1}=0$$

where % represents a modulo operator.

6. The device as claimed in claim 1, wherein a row index j is represented in base two, a current decomposition level being determined by determining a number of consecutive "ones" in a direction from a least significant bit to a most significant bit.

7. A device for decomposing images into at least three levels by wavelet transform, comprising:
   executing a first level of decomposition at a first decomposition unit;
   executing higher levels of decomposition by executing a series of processing tasks at a second decomposition unit, the processing tasks are ordered in time by using a sequence of rows and are executed on one row out of two, the processing tasks associated with the higher levels being executed on other rows; and
   configuring the second decomposition unit at a routing unit when a level of decomposition associated with a processing task currently being executed changes relative to a level of decomposition associated with a processing task executed previously, the processing tasks being ordered so that any given row is associated with only a single level of decomposition, wherein a set of variables used as a timing reference is determined and updated periodically by the second decomposition, said set of variables corresponding to an index of a current row and a current column processed by the second decomposition unit.

8. A method for decomposing images into at least three levels by using a wavelet transform, the method comprising:
   executing a first level of decomposition at a first decomposition unit;
   executing higher levels of decomposition by executing a series of processing tasks at a second decomposition unit, said processing tasks are ordered in time by using a sequence of rows; and
   configuring the second decomposition unit using a routing unit when a level of decomposition associated with a processing task currently being executed changes relative to the level of decomposition associated with the processing task executed previously, the processing tasks being ordered so that any given row is associated with only a single level of decomposition,
   wherein the first and the second decomposition units and the routing unit are associated with the device for recomposing images and are configured and realized by a processor configured to execute a computer program code for wavelet transforms, and
   wherein the routing unit generates a configuration signal at a start of a row, to be sent to the second decomposition unit having processing modules in order to parameterize a data path of said processing modules.

9. A non-transitory computer-readable medium including instructions for executing the method of claim 8, when the non-transitory computer-readable medium is executed by a processor.

* * * * *